United States Patent
Tanabiki et al.

(10) Patent No.: US 9,084,982 B2
(45) Date of Patent: Jul. 21, 2015

(54) WATER-ABSORBING RESIN COMPOSITION AND LAMINATE PRODUCED USING SAME

(75) Inventors: Fumio Tanabiki, Ohtake (JP); Akira Okazaki, Myoko (JP); Toshihiko Nijukken, Myoko (JP)

(73) Assignees: DAICEL-ALLNEX LTD., Tokyo (JP); DAICEL FINECHEM LTD., Tokyo (JP)

( * ) Notice: Subject to any disclaimer, the term of this patent is extended or adjusted under 35 U.S.C. 154(b) by 45 days.

(21) Appl. No.: 13/995,461

(22) PCT Filed: Dec. 16, 2011

(86) PCT No.: PCT/JP2011/079236
§ 371 (c)(1),
(2), (4) Date: Jun. 18, 2013

(87) PCT Pub. No.: WO2012/086552
PCT Pub. Date: Jun. 28, 2012

(65) Prior Publication Data
US 2013/0274405 A1    Oct. 17, 2013

(30) Foreign Application Priority Data
Dec. 22, 2010 (JP) .................. 2010-285560

(51) Int. Cl.
| | |
|---|---|
| C08L 51/00 | (2006.01) |
| B01J 20/26 | (2006.01) |
| C09D 5/00 | (2006.01) |
| C09D 5/16 | (2006.01) |
| C09D 7/12 | (2006.01) |
| C09D 133/26 | (2006.01) |
| C08F 220/56 | (2006.01) |
| C09D 4/06 | (2006.01) |
| C08K 5/103 | (2006.01) |
| C08F 220/06 | (2006.01) |
| C08F 220/14 | (2006.01) |
| C08F 220/20 | (2006.01) |
| C08F 222/10 | (2006.01) |

(52) U.S. Cl.
CPC ............ *B01J 20/261* (2013.01); *C08F 220/56* (2013.01); *C09D 4/06* (2013.01); *C09D 5/00* (2013.01); *C09D 5/1668* (2013.01); *C09D 7/125* (2013.01); *C09D 133/26* (2013.01); *C08F 220/06* (2013.01); *C08F 220/14* (2013.01); *C08F 220/20* (2013.01); *C08F 222/1006* (2013.01); *C08K 5/103* (2013.01); *C08K 2201/014* (2013.01)

(58) Field of Classification Search
CPC ........ B01J 20/261; C08F 220/56; C09D 4/06; C09D 133/26
USPC .................................................. 524/532, 533
See application file for complete search history.

(56) References Cited

U.S. PATENT DOCUMENTS

| | | | |
|---|---|---|---|
| 3,515,579 A | 6/1970 | Shephard et al. | |
| 3,933,407 A | 1/1976 | Tu et al. | |
| 5,180,760 A * | 1/1993 | Oshibe et al. | 523/169 |
| 2009/0196987 A1 | 8/2009 | Kurimura et al. | |

FOREIGN PATENT DOCUMENTS

| | | |
|---|---|---|
| JP | 04-138250 A | 5/1992 |
| JP | 6-41519 A | 2/1994 |
| JP | 11-140109 A | 5/1999 |
| JP | 11-202486 A | 7/1999 |
| JP | 2001-323029 A | 11/2001 |
| JP | 2005-290333 A | 10/2005 |
| JP | 2006-28335 A | 2/2006 |
| JP | 2010-260929 A | 11/2010 |
| WO | WO 2007/148506 A1 | 12/2007 |

OTHER PUBLICATIONS

International Search Report issued in PCT/JP2011/079236, dated Jan. 17, 2012.

* cited by examiner

*Primary Examiner* — Edward Cain
(74) *Attorney, Agent, or Firm* — Birch, Stewart, Kolasch & Birch, LLP

(57) ABSTRACT

Provided are: a water-absorbing resin composition and a laminate using the resin composition. The resin composition is capable of giving a transparent anti-fog coating excellent in properties such as appearance, coatability, anti-fog properties, water resistance, and heat resistance. Specifically, a resin composition includes a specific (meth)acrylamide copolymer (A) in combination with at least one bifunctional or higher (meth)acrylate compound (B), in which the (meth)acrylamide copolymer (A) is copolymerized from a (meth)acrylamide monomer with another monomer. This resin composition provides an active-energy-ray-curable water-absorbing resin composition and a laminate using the resin composition, each having excellent anti-fog properties.

13 Claims, No Drawings

WATER-ABSORBING RESIN COMPOSITION AND LAMINATE PRODUCED USING SAME

TECHNICAL FIELD

The present invention relates to: a water-absorbing resin composition; as well as an anti-fog coating resin composition and a water-absorbing cured article using the water-absorbing resin composition, and a laminate including the cured article typically with a plastic substrate.

BACKGROUND ART

Acrylic sheets, polycarbonate articles, and other plastic transparent articles have satisfactory lightweightness, transparency, workability, resistance to breaking, and safety upon breaking and are thereby used particularly in personal protective equipment such as sport goggles, helmet shields, safety goggles, and safety shields; industrial uses such as covers for display equipment and measuring instruments, lenses, and sensor covers; household appliances such as partitions and display cases in houses and stores; and uses associated with transportation, such as partitions, shelves, measuring instrument covers, and windows for automobiles and railway vehicles. Plastic materials for these uses, when used under conditions of high ambient temperature and humidity or under conditions with a large difference in temperature and/or in humidity, may fog and lose transparency due to dewing on the surface. To solve these disadvantages, a technique has been employed. This technique includes coating a substrate surface with an anti-fog composition including a nonreactive surfactant. Anti-fog properties obtained by this technique, however, decrease upon wiping out of the treated surface and lack durability, although the anti-fog properties are effectively exhibited in early stages after the coating. To improve durability of anti-fog properties, a technique has been proposed, which technique includes applying a hydrophillic polymer such as a poly(hydroxyalkyl(meth)acrylate) to an article, and thermally curing the applied polymer to form a film to thereby impart anti-fog properties to the article. The resulting article obtained by this technique, however, fails to have sufficient anti-fog performance although exhibiting certain anti-fog properties for a longer duration. In addition, the article disadvantageously has practically insufficient mechanical strengths (e.g., scratch resistance) or, when thermally formed typically into a goggle, has reduced anti-fog properties due to heat upon forming.

Patent Literature (PTL) 1 proposes, for better scratch resistance, an anti-fog coating composition which includes a polymer including an acrylamide compound as a copolymerized component, an epoxy-containing polymer, an epoxy-containing silane coupling agent, and a compound having a melamine skeleton in combination and which is thermally curable. However, it takes about one hour to cure the resin composition at 130° C. In addition, the resin composition as a mixture can be stored stably only in a short time and disadvantageously causes extremely inferior productivity.

PTL 2 proposes an active-energy-ray-curable anti-fog composition including a di(meth)acrylate having an alkylene glycol skeleton in combination with a reactive surfactant having an unsaturated group. The composition, however, has extremely low curability as compared to those of regular active-energy-ray-curable resins and disadvantageously has insufficient practical productivity, although the resulting cured article exhibits anti-fog performance for a longer duration. PTL 3 proposes a urethane(meth)acrylate having an alkylene glycol skeleton. The urethane(meth)acrylate, however, disadvantageously exhibits anti-fog performance lasting for an extremely short time in environments assumed in household appliance uses or vehicle uses, because the alkylene glycol skeleton is liable to be oxidized in a hot and humid environment. In contrast, PTL 4 proposes the use of a compound having an alkylene glycol skeleton in combination with an oxidation inhibitor (e.g., an ultraviolet absorber or thermal stabilizer) for helping the compound to have better durability in a hot and humid environment. The resulting article, however, disadvantageously gradually deteriorates in appearance because the oxidation inhibitor is oxidized by itself and colored.

CITATION LIST

Patent Literature

PTL 1: Japanese Unexamined Patent Application Publication (JP-A) No. H06-41519
PTL 2: JP-A No. H11-140109
PTL 3: JP-A No. 2005-290333
PTL 4: JP-A No. 2006-28335

SUMMARY OF INVENTION

Technical Problem

Accordingly, an object of the present invention is to solve the problems and to provide a water-absorbing resin composition capable of forming a transparent anti-fog coating which has anti-fog performance lasting significantly long and which excels in properties such as appearance, coatability, anti-fog properties, water resistance, and heat resistance. Another object of the present invention is to provide an anti-fog coating resin composition, a cured article, and a laminate using the water-absorbing resin composition.

Solution to Problem

After intensive investigations to solve the problems, the present inventors have found a composition containing a specific (meth)acrylamide copolymer and at least one bifunctional or higher (meth)acrylate compound, which (meth)acrylamide copolymer is derived from a (meth)acrylamide monomer and another monomer copolymerized with each other. The present inventors have found that this composition gives a water-absorbing coating which has a satisfactory surface hardness and has superior anti-fog properties lasting satisfactorily long. The present invention has been made based on these findings.

Specifically, the present invention provides a water-absorbing resin composition which includes at least a (meth)acrylamide copolymer (A); and a bifunctional or higher (meth)acrylate compound (B), the (meth)acrylamide copolymer (A) including a structural unit derived from a (meth)acrylamide monomer (A-1) represented by General Formula 1; and a structural unit derived from a monomer (A-2) other than the (meth)acrylamide monomer (A-1) and copolymerizable with the (meth)acrylamide monomer (A-1), General Formula 1 expressed as follows:

[Chem. 1]

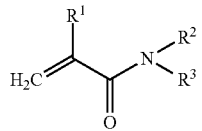

(Formula 1)

wherein $R^1$ represents hydrogen atom or methyl group; and $R^2$ and $R^3$ may be the same as or different from each other and are each hydrogen atom or an alkyl group having 1 to 6 carbon atoms which may have at least one hydroxyl group, or $R^2$ and $R^3$ may form a pyrrolidine ring, piperidine ring, or morpholine ring together with an adjacent nitrogen.

In a preferred embodiment, the (meth)acrylamide monomer (A-1) partially or wholly includes N,N-dimethylacrylamide; and the monomer (A-2) partially or wholly includes methyl methacrylate.

In another preferred embodiment, the (meth)acrylamide copolymer (A) has a weight-average molecular weight of 500 to 200,000 in terms of polyethylene oxide.

In yet another preferred embodiment, entire resin components in the water-absorbing resin composition contain the structural unit derived from the (meth)acrylamide monomer (A-1) in a content of 40 to 85 parts by weight per 100 parts by weight of the entire resin components.

The present invention further provides an anti-fog coating resin composition including the water-absorbing resin composition.

The present invention also provides a cured article cured from the water-absorbing resin composition.

In addition and advantageously, the present invention provides a laminate including a substrate; and a layer present on the substrate, the layer formed by applying the water-absorbing resin composition to the substrate and curing the applied resin composition.

Advantageous Effects of Invention

The present invention can provide a water-absorbing resin composition and an anti-fog coating resin composition capable of giving, respectively, a cured article and a transparent anti-fog coating which have anti-fog performance lasting significantly longer and which excel in properties such as appearance, coatability, anti-fog properties, water resistance, and heat resistance. The present invention can also provide a laminate using the anti-fog coating resin composition. These are achieved by employing a specific (meth)acrylamide copolymer (A) in combination with at least one bifunctional or higher (meth)acrylate compound (B), which (meth)acrylamide copolymer (A) is a copolymer of a (meth)acrylamide monomer (A-1) with another monomer (A-2). The water-absorbing resin composition; and the anti-fog coating resin composition, cured article, and laminate using the water-absorbing resin composition and according to embodiments of the present invention excel also in antistatic properties and/or self-cleaning properties (self-purifying properties) and are usable also in ink-jet receiving layers (waterborne ink type).

DESCRIPTION OF EMBODIMENTS

<Water-Absorbing Resin Composition>

A water-absorbing resin composition according to an embodiment of the present invention includes at least a (meth)acrylamide copolymer (A) and a bifunctional or higher (meth)acrylate compound (B), in which the (meth)acrylamide copolymer (A) includes a structural unit derived from a (meth)acrylamide monomer (A-1) represented by General Formula 1; and a structural unit derived from a monomer (A-2) that is other than the (meth)acrylamide monomer (A-1) and is copolymerizable with the (meth)acrylamide monomer (A-1), where General Formula 1 is expressed as follows:

[Chem. 2]

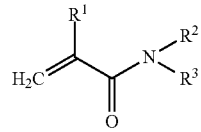

(Formula 1)

In General Formula 1, $R^1$ represents hydrogen atom or methyl group; and $R^2$ and $R^3$ may be the same as or different from each other and each represent hydrogen atom or an alkyl group having 1 to 6 carbon atoms which may have at least one hydroxyl group, or $R^2$ and $R^3$ may form a pyrrolidine ring, piperidine ring, or morpholine ring together with an adjacent nitrogen. The alkyl group having 1 to 6 carbon atoms is exemplified by methyl group, ethyl group, n-propyl group, isopropyl group, n-butyl group, isobutyl group, s-butyl group, t-butyl group, pentyl group, and hexyl group.

<(Meth)Acrylamide Copolymer (A)>

The (meth)acrylamide copolymer (A) included in the water-absorbing resin composition according to the present invention is obtained by subjecting a (meth)acrylamide monomer (A-1) represented by General Formula 1 and another monomer (A-2) to copolymerization (vinyl polymerization). The monomer (A-2) is other than the (meth)acrylamide monomer (A-1) and is copolymerizable with the (meth)acrylamide monomer (A-1).

<(Meth)Acrylamide Monomer (A-1)>

The (meth)acrylamide monomer (A-1) represented by General Formula 1 is specifically exemplified by N,N-dimethyl(meth)acrylamide, N,N-diethyl(meth)acrylamide, N,N-dipropyl(meth)acrylamide, N,N-dihexyl(meth)acrylamide, N,N-dihydroxyethyl(meth)acrylamide, N-(meth)acryloylpyrrolidine, N-(meth)acryloylpiperidine, and N-(meth)acryloylmorpholine. Two or more different (meth)acrylamide monomers (A-1) may be used in polymerization to form the (meth)acrylamide copolymer (A). The (meth)acrylamide monomer(s) (A-1) preferably includes N,N-dimethylacrylamide as a part or whole thereof (50 to 100 percent by weight).

The (meth)acrylamide copolymer (A) may contain the structural unit derived from the (meth)acrylamide monomer (A-1) in a content of typically 50 to 90 percent by weight, preferably 50 to 85 percent by weight, and furthermore preferably 60 to 80 percent by weight. If the structural unit is contained in a content of less than 50 percent by weight, the resin composition may give a cured article having insufficient water absorvency, and this may impede the use of the resin composition as an anti-fog coating material. If the structural unit is contained in a content of more than 85 percent by weight, the resin composition may give a cured article having remarkably inferior water resistance.

<Monomer (A-2) Other than (Meth)Acrylamide Monomer (A-1) and Copolymerizable with (Meth)Acrylamide Monomer (A-1)>

The monomer (A-2) other than the (meth)acrylamide monomer (A-1) and copolymerizable with the (meth)acrylamide monomer (A-1) [hereinafter also simply referred to as "monomer (A-2)"] is specifically exemplified by hydroxyl-containing monomers such as hydroxyethyl(meth)acrylate, 2-hydroxypropyl(meth)acrylate, and polyethylene glycol (meth)acrylates; and various (meth)acrylic esters and styrenic monomers. The (meth)acrylic esters are specifically exemplified by methyl(meth)acrylate, ethyl(meth)acrylate, butyl(meth)acrylate, 2-ethylhexyl(meth)acrylate, and other alkyl(meth)acrylates having an alkyl group containing 1 to 20 carbon atoms (e.g., methyl, ethyl, propyl, isopropyl, butyl, isobutyl, s-butyl, t-butyl, pentyl, hexyl, decyl, or dodecyl group); phenyl(meth)acrylate and other aryl(meth)acrylates having an aryl group containing 6 to 20 carbon atoms (e.g., phenyl group or naphthyl group); cyclohexyl(meth)acrylate, dicyclopentanyl(meth)acrylate, dicyclopentanyloxyethyl (meth)acrylate, isobornyl(meth)acrylate, and other (meth) acrylates having an alicyclic hydrocarbon group; and benzyl (meth)acrylate, phenylethyl(meth)acrylate, and other aralkyl (meth)acrylates. The styrenic monomers are exemplified by styrene, vinyltoluene, and α-methylstyrene. Among them, alkyl(meth)acrylates having an alkyl group containing 1 to 20 carbon atoms are preferred. Two or more different monomers (A-2) may be used in polymerization to form the (meth) acrylamide copolymer (A). The monomer (A-2) preferably includes methyl methacrylate as a part or whole thereof (50 to 100 percent by weight).

The (meth)acrylamide copolymer (A) may contain the structural unit derived from the monomer (A-2) in a content of typically 10 to 50 percent by weight, preferably 15 to 50 percent by weight, and furthermore preferably 20 to 40 percent by weight. If the structural unit is contained in a content of more than 50 percent by weight, the resin composition may give a cured article with insufficient water absorvency, and this may impede the use of the resin composition as an antifog coating material. If the structural unit is contained in a content of less than 10 percent by weight, the resin composition may give a cured article with remarkably inferior water resistance.

The (meth)acrylamide copolymer (A) may contain the structural unit derived from the (meth)acrylamide monomer (A-1) and the structural unit derived from the monomer (A-2) in a weight ratio (A-1)/(A-2) of typically from 95/5 to 40/60 and preferably from 90/10 to 50/50. If the (meth)acrylamide copolymer (A) contains these structural units in a weight ratio (A-1)/(A-2) of less than 40/60, the resin composition may give a cured article with insufficient water absorbency, and this may impede the use of the resin composition as an antifog coating material. If the (meth)acrylamide copolymer (A) contains these structural units in a weight ratio (A-1)/(A-2) of more than 95/5, the resin composition may give a cured article with remarkably inferior water resistance.

<Polymerization>

Polymerization to form the (meth)acrylamide copolymer (A) can be performed by a customary process for use in production of polystyrenes and poly((meth)acrylic ester)s, such as solution polymerization, bulk polymerization, suspension polymerization, bulk-suspension polymerization, or emulsion polymerization. Among them, solution polymerization is preferably employed. Each of the monomer (A-2) and a polymerization initiator may be fed in one batch to a reaction system, or part or all thereof may be added dropwise to the reaction system. Exemplary processes employable herein include a process of adding a solution of a polymerization initiator in a polymerization solvent dropwise to a mixture of monomers and another portion of the polymerization solvent held at a given temperature, followed by polymerization; and a process (dropping polymerization) of adding a solution to a polymerization solvent held at a given temperature, which solution has been prepared by dissolving monomers and a polymerization initiator in another portion of the polymerization solvent. The polymerization initiator usable herein is exemplified by azo polymerization initiators such as 2,2'-azobis(2,4-dimethylvaleronitrile) and dimethyl 2,2'-azobis (2-methylpropionate).

<Polymerization Solvent>

The polymerization solvent may be chosen according typically to a copolymerization formulation. The polymerization solvent is exemplified by ethers (e.g., chain ethers including diethyl ether; and glycol ethers such as ethylene glycol mono- or di-alkyl ethers, diethylene glycol mono- or di-alkyl ethers, propylene glycol mono- or di-alkyl ethers, propylene glycol mono- or di-aryl ethers, dipropylene glycol mono- or di-alkyl ethers, tripropylene glycol mono- or di-alkyl ethers, 1,3-propanediol mono- or di-alkyl ethers, 1,3-butanediol mono- or di-alkyl ethers, 1,4-butanediol mono- or di-alkyl ethers, glycerol mono-, di-, or tri-alkyl ethers; and cyclic ethers such as tetrahydrofuran and dioxane), esters (e.g., carboxylic acid esters such as methyl acetate, ethyl acetate, butyl acetate, isoamyl acetate, ethyl lactate, 3-methoxymethyl propionate, 3-ethoxyethyl propionate, $C_{5-6}$ cycloalkanediol mono- or di-acetates, and $C_{5-6}$ cycloalkanedimethanol mono- or di-acetates; and glycol acetates or glycol ether acetates, such as ethylene glycol monoalkyl ether acetates, ethylene glycol mono- or di-acetate, diethylene glycol monoalkyl ether acetates, diethylene glycol mono- or di-acetate, propylene glycol monoalkyl ether acetates, propylene glycol mono- or di-acetate, dipropylene glycol monoalkyl ether acetates, dipropylene glycol mono- or di-acetate, 1,3-propanediol monoalkyl ether acetates, 1,3-propanediol mono- or di-acetate, 1,3-butanediol monoalkyl ether acetates, 1,3-butanediol mono- or di-acetate, 1,4-butanediol monoalkyl ether acetates, 1,4-butanediol mono- or di-acetate, glycerol mono-, di-, or tri-acetate, glycerol mono- or di-$C_{1-4}$ alkyl ether di- or mono-acetates, tripropylene glycol monoalkyl ether acetates, and tripropylene glycol mono- or di-acetate), ketones (e.g., acetone, methyl ethyl ketone, methyl isobutyl ketone, cyclohexanone, and 3,5,5-trimethyl-2-cyclohexen-1-one), amides (e.g., N,N-dimethylacetamide and N,N-dimethylformamide), sulfoxides (e.g., dimethyl sulfoxide), alcohols (e.g., methanol, ethanol, propanol, $C_{5-6}$ cycloalkanediols, and $C_{5-6}$ cycloalkanedimethanols), hydrocarbons (e.g., aromatic hydrocarbons such as benzene, toluene, and xylenes; aliphatic hydrocarbons such as hexane; and alicyclic hydrocarbons such as cyclohexane), and mixtures of them. The polymerization may be performed at a temperature in the range typically from 30° C. to 150° C.

The process gives a (meth)acrylamide copolymer (A) to be contained in the water-absorbing resin composition according to the present invention. The (meth)acrylamide copolymer (A) may have a weight-average molecular weight of typically about 500 to about 200,000, preferably about 3,000 to about 100,000, and furthermore preferably about 5,000 to about 50,000 in terms of polyethylene oxide, with a dispersity (ratio of weight-average molecular weight to number-average molecular weight) of about 1 to about 5. The resin composition, if using a (meth)acrylamide copolymer (A) having a weight-average molecular weight of more than 200,000, may have a remarkably high viscosity when used as a coating material, may thereby require a large amount of a diluent such as water or an organic solvent, and may have remarkably poor compatibility with the bifunctional or higher (meth)acrylate compound (B). The resin composition, if using a (meth)acrylamide copolymer (A) having a weight-average molecular weight of less than 500, may give a cured article with insufficient water resistance and/or insufficient heat resistance.

A polymeric reaction mixture obtained by the process may be subjected to adjustment of solids concentration, solvent exchange, and/or filtration according to necessity and then may be combined with one or more additives. The additives are exemplified by fillers, antifoaming agents, flame retardants, oxidation inhibitors (antioxidants), ultraviolet absorbers, and colorants. Alternatively, a copolymer formed by polymerization may be purified typically by precipitation or reprecipitation, and the purified polymer may be dissolved together with suitable additives as mentioned above in a solvent according to the intended use.

<Bifunctional or Higher (Meth)Acrylate Compound (B)>

The bifunctional or higher (meth)acrylate compound (B) included in the water-absorbing resin composition according to the present invention is exemplified by: bifunctional or higher compounds out of (meth)acrylic esters to be used as the monomer (A-2); as well as multifunctional monomers, polyester (meth)acrylates, urethane (meth)acrylates, epoxy (meth)acrylates, and other compounds generally used as reactive diluents.

The multifunctional monomers are typified by dipropylene glycol di(meth)acrylate, neopentyl glycol di(meth)acrylate, hexanediol di(meth)acrylate, tripropylene glycol di(meth) acrylate, tricyclodecanedimethanol di(meth)acrylate, pentaerythritol tri(meth)acrylate, dipentaerythritol penta(meth) acrylate, dipentaerythritol tetra(meth)acrylate, and dipentaerythritol tri(meth)acrylate.

Such multifunctional monomers are also available as commercial products such as DPGDA (from DAICEL-CYTEC Company, Ltd.), FANCRYL FA-125M (from Hitachi Chemical Co., Ltd.), HDDA (from DAICEL-CYTEC Company, Ltd.), TPGDA (from DAICEL-CYTEC Company, Ltd.), IRR214-K (from DAICEL-CYTEC Company, Ltd.), PETIA (from DAICEL-CYTEC Company, Ltd.; a mixture mainly including pentaerythritol triacrylate and pentaerythritol tetraacrylate), DPHA (from DAICEL-CYTEC Company, Ltd.; a mixture mainly including dipentaerythritol pentaacrylate and dipentaerythritol hexaacrylate).

The polyester (meth)acrylates are multifunctional (meth) acrylates each synthetically prepared from a polyol and a (meth)acrylic ester. They may be available as commercial products such as ARONIX M-6100, ARONIX M-7100, and ARONIX M-8030 (each from Toagosei Co., Ltd.); and EBECRYL 450, EBECRYL 800, and EBECRYL 1830 (each from DAICEL-CYTEC Company, Ltd.).

The urethane (meth)acrylates are multifunctional (meth) acrylates each synthetically prepared from a hydroxyl-containing (meth)acrylic ester with a polyisocyanate or a urethane prepolymer synthesized from a polyisocyanate and a polyol. They may be available as commercial products such as EBECRYL 220, EBECRYL 1290, EBECRYL 8402, and KRM 8200 (each from DAICEL-CYTEC Company, Ltd.).

The epoxy(meth)acrylates are exemplified by multifunctional (meth)acrylates each synthetically prepared from (meth)acrylic acid and a compound typified by a bisphenol-A glycidyl ether and may also be available as commercial products such as EBECRYL 600, EBECRYL 3700, and EBECRYL 3701 (each from DAICEL-CYTEC Company, Ltd.). Two or more different bifunctional or higher (meth)acrylate compounds (B) may also be used.

<Monofunctional (Meth)Acrylate Compound (C)>

The water-absorbing resin composition according to the present invention may further employ a monofunctional (meth)acrylate compound (C) in addition to the bifunctional or higher (meth)acrylate compound (B). The monofunctional (meth)acrylate compound (C) is exemplified by heterocycle-containing (meth)acrylates such as tetrahydrofurfuryl(meth) acrylate; amide(meth)acrylates represented by Formula 1 and listed as the (meth)acrylamide monomer (A-1), such as acryloylmorpholine; alicycle-containing (meth)acrylates such as isobornyl(meth)acrylate; and alkoxyalkyl(meth)acrylates such as phenoxyethyl(meth)acrylate [of which aryloxyalkyl (meth)acrylates are preferred]. Such monofunctional (meth) acrylate compounds may also be available as commercial products such as V#150 (from Osaka Organic Chemical Industry Ltd.), ACMO (from KOHJIN Holdings Co., Ltd.), IBOA (from DAICEL-CYTEC Company, Ltd.), and EBECRYL 114 (from DAICEL-CYTEC Company, Ltd.). Two or more different monofunctional (meth)acrylate compounds (C) may also be used.

The water-absorbing resin composition according to the present invention may contain resin components in a total amount of typically 10 to 90 percent by weight, preferably 20 to 60 percent by weight, and more preferably 30 to 50 percent by weight. The resin components include, for example, the (meth)acrylamide copolymer (A), the bifunctional or higher (meth)acrylate compound (B), and the optionally added monofunctional (meth)acrylate compound (C). The water-absorbing resin composition, if containing resin components in a total amount of less than 10 percent by weight, may give a coating having an insufficient thickness; and, if containing resin components in a total amount of more than 90 percent by weight, may suffer from insufficient productivity due to its high viscosity. As used herein the term "resin components" refers to polymers and polymerizable compounds (monomers).

The water-absorbing resin composition according to the present invention may be used so as to contain the structural unit derived from the (meth)acrylamide monomer (A-1) in a content of preferably 40 to 85 parts by weight and more preferably 45 to 75 parts by weight, per 100 parts by weight of the total amount of resin components. The water-absorbing resin composition, if containing the structural unit in a content of more than 85 parts by weight may give a cured article having better water absorvency but worsen water resistance; and, if containing the structural unit in a content of less than 40 parts by weight, may give a cured article with worsen water absorvency, and this may impede the use of the resin composition as an anti-fog coating material.

The water-absorbing resin composition according to the present invention may contain the (meth)acrylamide copolymer (A) in a content of typically 40 to 95 parts by weight, preferably 40 to 85 parts by weight, more preferably 45 to 80 parts by weight, and furthermore preferably 50 to 75 parts by weight, per 100 parts by weight of the total amount of resin components. The resin composition, if containing the (meth) acrylamide copolymer (A) in a content of more than 95 parts by weight, may give a cured article having insufficient water resistance; and, if containing the (meth)acrylamide copolymer (A) in a content of less than 40 parts by weight, may give a cured article having insufficient anti-fog properties.

The water-absorbing resin composition according to the present invention may contain the bifunctional or higher (meth)acrylate compound (B) in a content of typically 5 to 60 parts by weight, preferably 15 to 60 parts by weight, more preferably 20 to 55 parts by weight, and furthermore preferably 25 to 50 parts by weight, per 100 parts by weight of the total amount of resin components. The resin composition, if containing the bifunctional or higher (meth)acrylate compound (B) in a content of more than 60 parts by weight, may give a cured article having insufficient anti-fog properties; and, if containing the bifunctional or higher (meth)acrylate compound (B) in a content of more than 5 parts by weight, may give a cured article having insufficient water resistance and insufficient heat resistance.

The water-absorbing resin composition according to the present invention may contain the monofunctional (meth) acrylate compound (C) in a content of typically 0 to 59 parts by weight, preferably 0 to 55 parts by weight, more preferably 0 to 50 parts by weight, furthermore preferably 0 to 40 parts by weight, and particularly preferably 0 to 25 parts by weight, per 100 parts by weight of the total amount of resin components. The resin composition, if containing the monofunctional (meth)acrylate compound (C) in a content of more than 59 parts by weight, may give a cured article having insufficient water resistance and/or insufficient heat resistance.

The water-absorbing resin composition according to the present invention may include a stabilizer for inhibiting gelation during storage and for maintaining satisfactory storage stability. Preferred examples of the stabilizer include phenols such as hydroquinone, hydroquinone monomethyl ether, t-butylhydroquinone, and catechol; quinones such as benzoquinone, naphthoquinone, and diphenylbenzoquinone; phenothiazine; and copper salts. These stabilizers may be used in an amount of preferably 0.0001 to 0.1 part by weight per 100 parts by weight of resin composition components.

<Photoinitiator and Photosensitizer>

The water-absorbing resin composition according to the present invention can be easily cured by the action of any of visible light or ultraviolet rays, electron beams, and other active energy rays. The resin composition, when to be cured by the action of visible light or an ultraviolet ray, may be combined with any of generally-employed photoinitiators and photosensitizers. Exemplary photoinitiators are as follows. Exemplary acetophenone photoinitiators include 2-methyl[4-(methylthio)phenyl]-2-morpholino-1-propanone [available from BASF SE as IRGACURE-907], benzyl dimethyl ketal [available from BASF SE as IRGACURE-651], 1-hydroxycyclohexylphenyl ketone [available from BASF SE as IRGACURE-184], 2-hydroxy-2-methyl-1-phenylpropan-1-one [available from BASF SE as DAROCUR 1173], 4-(2-hydroxyethoxy)phenyl (2-hydroxy-2-propyl) ketone [available from BASF SE as IRGACURE-2959], and 2-benzyl-2-dimethylamino-1-(4-morpholinophenyl)-butanone [available from BASF SE as IRGACURE-369]. Exemplary benzoin ether photoinitiators include benzoin, benzoin methyl ether, benzoin ethyl ether, benzoin isopropyl ether, and benzoin isobutyl ether. Exemplary benzophenone photoinitiators include benzophenone, methyl o-benzoylbenzoate, 4-phenylbenzophenone, 4-benzoyl-4'-methyl-diphenyl sulfide, and 2,4,6-trimethylbenzophenone. Exemplary thioxanthone photoinitiators include 2-isopropylthioxanthone, 2,4-diethylthioxanthone, 2,4-dichlorothioxanthone, and 1-chloro-4-propoxythioxanthone. Exemplary phosphine oxide photoinitiators include (2,4,6-trimethylbenzoyl)diphenylphosphine oxide and bis(2,6-dimethoxybenzoyl)-2,4,4-trimethylpentylphosphine oxide. Examples of the photosensitizers include triethanolamine, methyldiethanolamine, triisopropanolamine, methyl 4-dimethylaminobenzoate, ethyl 4-dimethylaminobenzoate, isoamyl 4-dimethylaminobenzoate, 4,4-dimethylaminobenzophenone, and 4,4-diethylaminobenzophenone.

The resin composition may employ such photoinitiator and/or photosensitizer in a blending ratio of typically preferably 0.5 to 20 parts by weight per 100 parts by weight of the bifunctional or higher (meth)acrylate compound (B) component, though the blending ratio may be set according to a common procedure. The resin composition, if containing a photoinitiator and/or photosensitizer in a blending ratio of less than 0.5 part by weight, may suffer from insufficient curing; and, if containing a photoinitiator and/or photosensitizer in a blending ratio of more than 20 parts by weight, may give a cured coating which may be colored or have odor derived from the photoinitiator and thereby have inferior properties. The resin composition particularly preferably contains such an initiator in an amount of 1 to 10 parts by weight. The water-absorbing resin composition according to the present invention, when to be cured by the application of electron beams or radioactive rays, may employ any of the above-exemplified photoinitiators and photosensitizers or may contain neither photoinitiators nor photosensitizers.

<Diluting Solvent>

The resin composition may employ a diluting solvent. The diluting solvent is exemplified by hydrocarbon solvents such as toluene and xylenes; ester solvents such as n-butyl acetate, methylcellosolve acetate, and propylene glycol monomethyl ether acetate; ketone solvents such as methyl isobutyl ketone and diisobutyl ketone; and ether solvents such as ethylene glycol monomethyl ether and ethylene glycol monoethyl ether. Among them, propylene glycol monomethyl ether acetate and ethylene glycol monoethyl ether are preferred from the viewpoints of Law Concerning Pollutant Release and Transfer Register [PRTR Law] and toxicity. Where necessary, the resin composition may employ any of other solvents such as methyl ethyl ketone, ethyl acetate, butyl acetate, isopropyl alcohol, and isobutyl alcohol. The water-absorbing resin composition may contain the diluting solvent in a content of typically 10 to 90 percent by weight, preferably 40 to 80 percent by weight, more preferably 50 to 70 percent by weight, based on the total amount of the resin composition. The resin composition, if containing a diluting solvent in a content of more than 90 percent by weight, may give a coating having an insufficient thickness; and, if containing a diluting solvent in a content of less than 10 percent by weight, may suffer from inferior productivity due to an excessively high viscosity.

<Additives>

The water-absorbing resin composition according to the present invention may further include any of additives according to necessity. Such additives are exemplified by dyestuffs and pigments, leveling agents, ultraviolet absorbers, photostabilizers, antifoaming agents, dispersing agents, and thixotropy-imparting agents. The resin composition may contain such additives in an amount of 0 part by weight or more and 10 parts by weight or less and preferably 0.05 part by weight or more and 5 parts by weight or less, per 100 parts by weight of resin components in the resin composition.

<Ultraviolet Absorber>

The ultraviolet absorbers which may be contained in the water-absorbing resin composition according to the present invention are not limited, as long as being those that can be dissolved uniformly in the composition and can impart necessary weatherability to the composition. Among such ultraviolet absorbers, preferred are ultraviolet absorbers which are compounds derived from benzophenone, benzotriazole, phenyl salicylate, or phenyl benzoate and which have a wavelength of maximum absorption in the range from 240 to 380 nm; of which benzophenone-derived or benzotriazole-derived ultraviolet absorbers are preferred, and the combination use of photoinitiators of the two types is most preferred.

Such ultraviolet absorbers are exemplified by 2-hydroxybenzophenone, 5-chloro-2-hydroxybenzophenone, 2,4-dihydroxybenzophenone, 2-hydroxy-4-methoxybenzophenone, 2-hydroxy-4-octyloxybenzophenone, 4-dodecyloxy-2-hydroxybenzophenone, 2-hydroxy-4-octatecycloxybenzophenone, 2,2'-dihydrokyne-4-methoxybenzophenone, 2,2'-dihydroxy-4,4'-dimethoxybenzophenone phenyl salicylate, p-tert-butylphenyl salicylate, p-(1,1,3,3-tetramethylbutyl) phenyl salicylate, 3-hydroxyphenylbenzoate, phenylene-1,3-dibenzoate, 2-(2-hydroxy-5'-methylphenyl)benzotriazole, 2-(2-hydroxy-5-tert-butylphenyl)-5-chlorobenzotriazole, 2-(2-hydroxy-3,5-tert-butylphenyl)benzotriazole, 2-(2-hydroxy-5-tert-butylphenyl)benzotriazole, 2-(2-hydroxy-4-octylphenyl)benzotriazole, 2-(2'-hydroxy-5'-methacryloxyethylphenyl)-2H-benzotriazole, 2-(2,4-dihydroxyphenyl)-4,6-bis(2,4-dimethylphenyl)-2H-benzotriazole, and reaction products between 2-(2,4-dihydroxyphenyl)-4,6-bis(2,4-dimethylphenyl)-1,3,5-triazine and a glycidyl alkyl(C12-C13) ether. Among them, preferred are 2-hydroxy-4-octoxybenzophenone and 2,4-dihydroxybenzophenone as benzophenone-derived compounds; and 2-(2-hydroxy-tert-butylphenyl)benzotriazole as a benzotriazole-derived compound. Two or more of these may be used in combination.

<Leveling Agent>

In an embodiment of the present invention, the water-absorbing resin composition may further include a leveling additive for satisfactory coatability. Such leveling additive acts on the coating surface after application and reduces the surface tension. The leveling additive is preferably at least one selected from the group consisting of fluorine additives, siloxane additives, acrylic additives, and acetylene glycol additives.

Typically, the fluorine additives are exemplified by, but not limited to, Fluorad FC-430 and Fluorad FC170 supplied by Sumitomo 3M Limited; and Megafac F177 and Megafac F471 supplied by DIC Corporation. The siloxane additives are exemplified by BYK-300 and BYK-077 supplied by Byk-Chemie GmbH. The acrylic additives are exemplified by BYK-380 supplied by Byk-Chemie GmbH; and DISPARLON L-1984-50 and DISPARLON L-1970 supplied by Kusumoto Chemicals, Ltd. The acetylene glycol additives are exemplified by DYNOL 604 and Surfynol 104 supplied by Shin-Etsu Chemical Co., Ltd. Each of different leveling additives may be used alone or in combination.

[Inorganic Filler]

The water-absorbing resin composition according to the present invention may further include an inorganic filler. The inorganic filler is exemplified by, but not limited to, nanosilica, nanotitania, nanozirconia, carbon nanotubes, silica, alumina, mica, synthetic mica, talc, calcium oxide, calcium carbonate, zirconium oxide, titanium oxide, barium titanate, kaolin, bentonite, diatomaceous earth, boron nitride, aluminum nitride, silicon carbide, zinc oxide, cerium oxide, cesium oxide, magnesium oxide, glass bead, glass fiber, graphite, calcium hydroxide, magnesium hydroxide, aluminum hydroxide, and cellulose. Each of them may be used alone or in combination. Such inorganic fillers may be prepared according to known processes, such as flame hydrolysis, flame pyrolysis, and plasma process as described in PCT International Publication Number WO/1996/31572.

Of inorganic fillers, preferably usable are nanodisperse sols of stabilized colloidal inorganic particles such as nanosilica, nanotitania, nanozirconia, and carbon nanotubes. Inorganic fillers are also available as commercial products such as silica sol from BAYER AG, $SnO_2$ sols from Goldschmidt, $TiO_2$ sols from MERCK & Co., Inc., $SiO_2$, $ZrO_2$, $Al_2O_3$, and $Sb_2O_3$ sols from Nissan Chemicals, and Aerosil dispersions from DEGUSSA AG.

An inorganic filler may have a varying viscosity behavior as a result of surface modification. The surface modification of inorganic filler particles may be performed using a known surface modifier. The surface modifier usable herein is exemplified by compounds capable of undergoing an interaction (e.g., formation of a covalent bond or formation of a complex) with a functional group present on the surface of the inorganic filler; and compounds capable of undergoing an interaction with the polymer matrix. Exemplary surface modifiers include compounds each having, in the molecule, any of functional groups such as carboxyl groups, (primary, secondary, or tertiary) amino groups, quaternary ammonium groups, carbonyl groups, glycidyl groups, vinyl groups, (meth)acryloxy groups, and mercapto groups. The surface modifier may generally include a low-molecular-weight organic compound which is liquid at normal temperature and pressure and has typically 15 or less, preferably 10 or less, and particularly preferably 8 or less carbon atoms per molecule. The low-molecular-weight organic compound may have a molecular weight of typically 500 or less, preferably 350 or less, and particularly preferably 200 or less.

Preferred examples of surface modifiers include saturated or unsaturated mono- and poly-carboxylic acids having 1 to 12 carbon atoms, such as formic acid, acetic acid, propionic acid, butyric acid, pentanoic acid, hexanoic acid, acrylic acid, methacrylic acid, crotonic acid, citric acid, adipic acid, succinic acid, glutaric acid, oxalic acid, maleic acid, and fumaric acid (of which monocarboxylic acids are preferred); and esters of them (of which methyl methacrylate and other $C_{1-4}$ alkyl esters are preferred); amides; and β-dicarbonyl compounds such as acetylacetone, 2,4-hexanedione, 3,5-heptanedione, acetoacetic acid, and ($C_{1-4}$ alkyl)acetoacetic acids. Any of known or customary silane coupling agents may also be used as the surface modifier.

The inorganic filler may have a particle diameter of generally about 0.01 nm to about 200 μm, preferably about 0.1 nm to about 100 μm, and particularly preferably about 0.1 nm to about 50 μm.

The water-absorbing resin composition may contain the inorganic filler in a content of preferably 1 to 2000 parts by weight and more preferably 10 to 1000 parts by weight, per 100 parts by weight of the total content of the compound (A) and the compound (B). The water-absorbing resin composition may contain the inorganic filler in a content of typically 5 to 95 percent by weight and preferably 10 to 90 percent by weight based on the total amount of the resin composition.

The water-absorbing resin composition according to the present invention has superior coatability and, when cured, is capable of giving a cured article which has anti-fog performance lasting significantly longer and excels in properties such as appearance, anti-fog properties, water resistance, and heat resistance. In addition, the water-absorbing resin composition according to the present invention excels in antistatic properties and self-cleaning properties (self-purifying properties) and is also usable to form an ink-jet receiving layer (waterborne ink type).

<Anti-Fog Coating Resin Composition>

The water-absorbing resin composition according to the present invention is usable as an anti-fog coating resin composition (resin composition for anti-fog coating). Specifically, an anti-fog coating resin composition according to an embodiment of the present invention includes the water-absorbing resin composition and can thereby give a transparent anti-fog coating which has anti-fog performance lasting significantly longer and excels in properties such as appearance, coatability, anti-fog properties, water resistance, and heat resistance. In addition, the anti-fog coating resin composition according to the present invention excels in antistatic properties and self-cleaning properties (self-purifying properties) and is also usable to form an ink-jet receiving layer (waterborne ink type).

<Cured Article>

A cured article according to an embodiment of the present invention is obtained by curing the water-absorbing resin composition. The cured article according to the present invention has anti-fog performance lasting significantly longer and excels in properties such as appearance, anti-fog properties, water resistance, and heat resistance. In addition, the cured article according to the present invention further excels in antistatic properties and self-cleaning properties (self-purifying properties) and is also usable as an ink-jet receiving layer (waterborne ink type).

Curing Technique

The water-absorbing resin composition can be cured within a very short time by the irradiation with an ultraviolet ray, electron beamsm, or another active energy ray. Exemplary light sources for the irradiation with an ultraviolet ray include high-pressure mercury lamps, ultra-high-pressure mercury lamps, carbon arc lamps, xenon lamps, and metal halide lamps. The irradiation may be performed for a time of at longest several tens of seconds and generally several seconds, although the irradiation time may vary depending on conditions such as the type of the light source and the distance between the light source and the coating surface. An irradiation source with a lamp output of about 80 to about 300 W/cm is generally used. For the irradiation with electron beams, electron beams having energy in the range from 50 to 1000 KeV are preferably used at an irradiation level of 2 to 5 Mrad. After the irradiation with an active energy ray, heating may be performed according to necessity to promote curing.

<Laminate>

A laminate according to an embodiment of the present invention has a substrate; and a cured coating on or above the substrate, in which the cured coating has been formed by applying and curing the water-absorbing resin composition. For better interlayer adhesion, the laminate may further include an intermediate layer between the substrate and the cured coating derived from the water-absorbing resin composition.

<Substrate>

The substrate on which the water-absorbing resin composition according to the present invention is applied and cured is exemplified by a film, a sheet, or a molded article of glass, a metal, or a plastic substrate. The plastic substrate is preferably transparent. The plastic substrate is exemplified by plastic substrates of thermoplastic resins such as polyesters, polyethylenes, polypropylenes, poly(ethylene terephthalate)s, cellophane, diacetylcellulose, triacetylcellulose, acetylcellulose butyrate, poly(vinyl chloride)s, poly(vinylidene chloride)s, poly(vinyl alcohol)s, ethylene vinyl alcohols, polystyrenes, polycarbonates, polymethylpenters, polysulfones, poly(ether ketone)s, poly(ether sulfone)s, poly(ether imide)s, polyimides, and acrylic polymers.

Coating/Drying Technique

A coating technique usable to apply the water-absorbing resin composition according to the present invention to the substrate is exemplified by, but not limited to, air-less spraying, air spraying, roll coating, bar coating, gravure coating, and die coating. Among them, roll coating is most preferred because this technique can form a thin coating (thin film), enables partial coating, and is performed at low cost with good workability. The coating technique may be either of so-called in-line coating performed during production process typically of a plastic substrate; and so-called off-line coating of coating an already-produced plastic substrate in another process than the production process.

Curing Technique

The water-absorbing resin composition according to the present invention, after applied to a target plastic substrate, may be cured by the technique described as above in the cured article.

The laminate according to the present invention has anti-fog performance lasting significantly longer and excels in properties such as appearance, anti-fog properties, water resistance, and heat resistance. In addition, the laminate according to the present invention further excels in antistatic properties and self-cleaning properties (self-purifying properties) and is also usable as an ink-jet receiving layer (waterborne ink type).

EXAMPLES

The present invention will be illustrated in further detail with reference to following working examples which are by no means intended to limit the scope of the invention. Abbreviations and contents of compounds and agents used in these examples are as follows.
TMPTA: Trimethylolpropane triacrylate, supplied by DAICEL-CYTEC Company, Ltd.
PETIA: Mixture of pentaerythritol triacrylate and pentaerythritol tetraacrylate, supplied by DAICEL-CYTEC Company, Ltd.
DPHA: Mixture of dipentaerythritol pentaacrylate and dipentaerythritol hexaacrylate, supplied by DAICEL-CYTEC Company, Ltd.
KRM8200: Multifunctional urethane acrylate, supplied by DAICEL-CYTEC Company, Ltd.
EBECRYL 3700: Bisphenol-A type epoxy acrylate, supplied by DAICEL-CYTEC Company, Ltd.
EBECRYL 1830: Multifunctional polyester acrylate, supplied by DAICEL-CYTEC Company, Ltd.
IBOA: Isobornyl acrylate, supplied by DAICEL-CYTEC Company, Ltd.
Photoinitiator: 1-Hydroxycyclohex-1-yl phenyl ketone, Irgacure 184 supplied by Ciba Japan K.K.
MMPG: Propylene glycol monomethyl ether
P-1: N,N-Dimethylacrylamide/methyl methacrylate/methacrylic acid (75/20/5) copolymer, Mw: 44,000
P-2: N,N-Dimethylacrylamide/methyl methacrylate (75/25) copolymer, Mw: 14,600
P-3: N,N-dimethylacrylamide/methyl methacrylate (50/50) copolymer, Mw: 19,000
P-4: N,N-Dimethylacrylamide/methyl methacrylate copolymer (90/10), Mw: 10,200
P-5: N,N-Diethylmethacrylamide/methyl methacrylate (75/25) copolymer, Mw: 20,400
P-6: N,N-Dimethylacrylamide/N,N-diethylmethacrylamide/methyl methacrylate (60/15/25) copolymer, Mw: 25,000
P-7: N,N-Dimethylacrylamide/N-acryloylmorpholine/methyl methacrylate (60/15/25) copolymer, Mw: 22,000

SYNTHETIC EXAMPLES

Synthetic Example 1

Synthetic Example of P-1

In a 2-liter separable flask equipped with a stirrer, a thermometer, a reflux condenser, a nitrogen inlet tube, and two dropping funnels, were placed 67.5 g of N,N-dimethylacrylamide, 18.0 g of 2-hydroxyethyl methacrylate, 4.51 g of methacrylic acid, and 150 g of methoxypropanol. The mixture was heated to 70° C. and combined with a solution of 0.24 g of 2,2'-azobis(2,4-dimethylvaleronitrile) [V-65, supplied by Wako Pure Chemical Industries, Ltd.] in 4.9 g of methoxypropanol, followed by prepolymerization for 30 minutes.

A mixture and a solution previously charged respectively in the two dropping funnels were then concurrently added dropwise over three hours. The mixture was a mixture of 158 g of N,N-dimethylacrylamide, 42.0 g of 2-hydroxyethyl methacrylate, and 10.5 g of methacrylic acid. The solution was a solution of 1.33 g of 2,2'-azobis(2,4-dimethylvaleronitrile) [V-65, supplied by Wako Pure Chemical Industries, Ltd.] in 134 g of methoxypropanol.

After the completion of dropwise addition of the monomers and initiator and subsequent continuous polymerization at 70° C. for 30 minutes, the resulting mixture was further combined with a solution of 0.37 g of 2,2'-azobis(2,4-dimethylvaleronitrile) [V-65, supplied by Wako Pure Chemical Industries, Ltd.] in 13.3 g of methoxypropanol, which solution was added dropwise over one hour. After being continuously polymerized for further one hour, the mixture was combined with a solution of 0.37 g of 2,2'-azobis(2,4-dimethylvaleronitrile) [V-65, supplied by Wako Pure Chemical Industries, Ltd.] in 13.3 g of methoxypropanol and aged for two hours for the reduction of residual monomers, combined with 379 g of methoxypropanol, cooled down to room temperature, and thereby yielded an acrylic copolymer (resin). This had a resin content of 30 percent by weight, and the resin had a (meth)acrylamide content of 75 percent by weight.

The acrylic copolymer was found to have a weight-average molecular weight of 44,000 in terms of polyethylene oxide as measured with GPC LC-10 System supplied by Shimadzu Corporation. In the measurement, one TSK-GURD column PWXL and two TSK-GEL columns GMPW were used. A mobile phase was used at a flow rate of 0.6 mL/min, which mobile phase was a mixture of 3 parts by weight of acetic acid, 2 parts by weight of sodium acetate, 77 parts by weight of distilled water, and 18 parts by weight of acetonitrile. The measurement was performed using a differential refractometer as a detector at a temperature of 40° C., where 40 µL of a sample having a concentration of 0.5 percent by weight was injected.

Synthetic Example 2

Synthesis of P-2

In an apparatus as in Synthetic Example 1 were placed 18.7 g of N,N-dimethylacrylamide, 6.2 g of methyl methacrylate, and 150 g of methoxypropanol. The mixture was heated to 90° C. and combined with a solution of 0.48 g of dimethyl 2,2'-azobis(2-methylpropionate) [V-601 supplied by Wako Pure Chemical Industries, Ltd.] in 4.9 g of methoxypropanol, followed by prepolymerization for 30 minutes.

Next, a mixture and a solution previously charged respectively in the two dropping funnels were concurrently added dropwise over four hours. The mixture was a mixture of 206 g of N,N-dimethylacrylamide and 69 g of methyl methacrylate. The solution was a solution of 3.92 g of dimethyl 2,2'-azobis(2-methylpropionate) [V-601 supplied by Wako Pure Chemical Industries, Ltd.] in 134 g of methoxypropanol.

After the completion of dropwise addition of the monomers and initiator and subsequent continuous polymerization at 90° C. for 30 minutes, the resulting mixture was further combined with a solution of 0.96 g of dimethyl 2,2'-azobis (2-methylpropionate) [V-601 supplied by Wako Pure Chemical Industries, Ltd.] in 29.7 g of methoxypropanol, which solution was added dropwise over one hour. After being continuously polymerized for further one hour, the mixture was combined with a solution of 0.96 g of dimethyl 2,2'-azobis (2-methylpropionate) [V-601 supplied by Wako Pure Chemical Industries, Ltd.] in 29.7 g of methoxypropanol and aged at 90° C. for two hours for the reduction of residual monomers, combined with 344 g of methoxypropanol, cooled down to room temperature, and thereby yielded an acrylic copolymer (resin). This had a resin content of 30 percent by weight, and the resin had a (meth)acrylamide content of 75 percent by weight.

The acrylic copolymer was found to have a weight-average molecular weight of 14,600 as measured by the procedure of Synthetic Example 1 in terms of polyethylene oxide.

Synthetic Example 3

Synthetic Example of P-3

In an apparatus as in Synthetic Example 1 were placed 12.5 g of N,N-dimethylacrylamide, 12.5 g of methyl methacrylate, and 150 g of methoxypropanol. The mixture was heated to 90° C. and combined with a solution of 0.48 g of dimethyl 2,2'-azobis(2-methylpropionate) [V-601 supplied by Wako Pure Chemical Industries, Ltd.] in 4.9 g of methoxypropanol, followed by prepolymerization for 30 minutes.

Next, a mixture and a solution previously charged respectively in the two dropping funnels were concurrently added dropwise over four hours. The mixture was a mixture of 138 g of N,N-dimethylacrylamide and 138 g of methyl methacrylate. The solution was a solution of 3.92 g of dimethyl 2,2'-azobis(2-methylpropionate) [V-601 supplied by Wako Pure Chemical Industries, Ltd.] in 134 g of methoxypropanol.

After the completion of dropwise addition of the monomers and initiator and subsequent continuous polymerization at 90° C. for 30 minutes, the resulting mixture was further combined with a solution of 0.96 g of dimethyl 2,2'-azobis (2-methylpropionate) [V-601 supplied by Wako Pure Chemical Industries, Ltd.] in 29.7 g of methoxypropanol, which solution was added dropwise over one hour. After continuing polymerization for one hour, the mixture was combined with a solution of 0.96 g of dimethyl 2,2'-azobis(2-methylpropionate) [V-601 supplied by Wako Pure Chemical Industries, Ltd.] in 29.7 g of methoxypropanol and aged at 90° C. for two hours for the reduction of residual monomers, combined with 344 g of methoxypropanol, cooled down to room temperature, and thereby yielded an acrylic copolymer (resin). This had a resin content of 30 percent by weight, and the resin had a (meth)acrylamide content of 50 percent by weight.

The acrylic copolymer was found to have a weight-average molecular weight of 19,000 as measured by the procedure of Synthetic Example 1 in terms of polyethylene oxide.

Synthetic Example 4

Synthetic Example of P-4

In an apparatus as in Synthetic Example 1 were placed 22.5 g of N,N-dimethylacrylamide, 2.5 g of methyl methacrylate, and 150 g of methoxypropanol. The mixture was heated to 80° C. and combined with a solution of 0.48 g of dimethyl 2,2'-azobis(2-methylpropionate) [V-601 supplied by Wako Pure Chemical Industries, Ltd.] in 4.9 g of methoxypropanol, followed by prepolymerization for 30 minutes.

Next, a mixture and a solution previously charged respectively in the two dropping funnels were concurrently added dropwise over four hours. The mixture was a mixture of 248 g of N,N-dimethylacrylamide and 27.6 g of methyl methacrylate. The solution was a solution of 3.92 g of dimethyl 2,2'-azobis(2-methylpropionate) [V-601 supplied by Wako Pure Chemical Industries, Ltd.] in 134 g of methoxypropanol.

After the completion of dropwise addition of the monomers and initiator and subsequent continuous polymerization at 80° C. for 30 minutes, the resulting mixture was further combined with a solution of 0.96 g of dimethyl 2,2'-azobis (2-methylpropionate) [V-601 supplied by Wako Pure Chemical Industries, Ltd.] in 29.7 g of methoxypropanol, which solution was added dropwise over one hour. After being continuously polymerized for further one hour, the mixture was combined with a solution of 0.96 g of dimethyl 2,2'-azobis (2-methylpropionate) [V-601 supplied by Wako Pure Chemical Industries, Ltd.] in 29.7 g of methoxypropanol and aged at 80° C. for two hours for the reduction of residual monomers, combined with 344 g of methoxypropanol, cooled down to room temperature, and thereby yielded an acrylic copolymer (resin). This had a resin content of 30 percent by weight, and the resin had a (meth)acrylamide content of 90 percent by weight.

The acrylic copolymer was found to have a weight-average molecular weight of 10,200 as measured by the procedure of Synthetic Example 1 in terms.

Synthetic Example 5

Synthesis of P-5

A methacrylic copolymer was obtained by the procedure of Synthetic Example 2, except for using, instead of N,N-dimethylacrylamide, N,N-diethylmethacrylamide. This had a resin content of 30 percent by weight, and the resin had a (meth)acrylamide content of 75 percent by weight.

The methacrylic copolymer was found to have a weight-average molecular weight of 20,400 as measured by the procedure of Synthetic Example 1 in terms of polyethylene oxide.

Synthetic Example 6

Synthesis of P-6

A methacrylic copolymer was obtained by the procedure of Synthetic Example 2, except for using, instead of N,N-dimethylacrylamide, a 8:2 (by weight) mixture of N,N-dimethylacrylamide and N,N-diethylmethacrylamide. This had a resin content of 30 percent by weight, and the resin had a (meth)acrylamide content of 75 percent by weight.

The methacrylic copolymer was found to have a weight-average molecular weight of 25,000 as measured by the procedure of Synthetic Example 1 in terms of polyethylene oxide.

Synthetic Example 7

Synthesis of P-7

A methacrylic copolymer was obtained by the procedure of Synthetic Example 2, except for using, instead of N,N-dimethylacrylamide, a 8:2 (by weight) mixture of N,N-dimethylacrylamide and N-acryloylmorpholine. This had a resin content of 30 percent by weight, and the resin had a (meth)acrylamide content of 75 percent by weight.

The methacrylic copolymer was found to have a weight-average molecular weight of 22,000 as measured by the procedure of Synthetic Example 1 in terms of polyethylene oxide.

Examples 1 to 14 and Comparative Examples 1 and 2

Components given in Table 1 were charged in a stainless steel beaker, mixed and stirred with a homogenizer "T.K. ROBOMIX" supplied by PRIMIX Corporation, and yielded compositions (water-absorbing resin compositions) of Examples 1 to 14 and Comparative Examples 1 and 2. A resin content (content of resin components) of each composition, and a content of (meth)acrylamide [(meth)acrylamide monomer (A-1)] in the resin components are indicated in lower columns in Table 1.

TABLE 1

| | Composition Formulation (in part by weight) | | | | | | | | | | | | | | | |
|---|---|---|---|---|---|---|---|---|---|---|---|---|---|---|---|---|
| | Examples | | | | | | | | | | | | | | Comparative Examples | |
| | 1 | 2 | 3 | 4 | 5 | 6 | 7 | 8 | 9 | 10 | 11 | 12 | 13 | 14 | 1 | 2 |
| P-1 Mw 44000 | 400 | 400 | 400 | 400 | 400 | 400 | 400 | | | | | | | | | |
| P-2 Mw 14600 | | | | | | | | 400 | 400 | | | | | | 400 | 400 |
| P-3 Mw 19000 | | | | | | | | | | 400 | | | | | | |
| P-4 Mw 10200 | | | | | | | | | | | 400 | | | | | |
| P-5 Mw 20400 | | | | | | | | | | | | 400 | | | | |
| P-6 Mw 25000 | | | | | | | | | | | | | 400 | | | |
| P-7 Mw 22000 | | | | | | | | | | | | | | 400 | | |
| TMPTA | 100 | 30 | | | | | | | | | | | | | | |
| PETIA | | | 30 | | | | | | | | | | | | | |
| DPHA | | | | 30 | | | | | | | | | | | | |
| EBECRYL 1830 | | | | | 30 | | | | | | | | | | | |
| EBECRYL 3700 | | | | | | 30 | | | | | | | | | | |
| KRM 8200 | | | | | | | 30 | 10 | 20 | 10 | 10 | 10 | 10 | 10 | | |
| IBOA | | | | | | | | | 10 | | | | | | | 30 |
| Photoinitiator | 4 | 1 | 1 | 1 | 1 | 1 | 1 | 0.4 | 1 | 0.4 | 0.4 | 0.4 | 0.4 | 0.4 | | 1.2 |
| MMPG | 240 | 72 | 72 | 72 | 72 | 72 | 72 | 24 | 72 | 24 | 24 | 24 | 24 | 24 | | 72 |
| Total | 744 | 503 | 503 | 503 | 503 | 503 | 503 | 434 | 503 | 434 | 434 | 434 | 434 | 434 | 400 | 503 |
| Content (in weight percent) of resin components | 29.6 | 29.8 | 29.8 | 29.8 | 29.8 | 29.8 | 29.8 | 29.9 | 29.8 | 29.9 | 29.9 | 29.9 | 29.9 | 29.9 | 30.0 | 29.8 |
| Content (in weight percent) of (meth)acrylamide (A-1) in resin components | 40.9 | 60.0 | 60.0 | 60.0 | 60.0 | 60.0 | 60.0 | 69.2 | 60.0 | 46.2 | 83.1 | 69.2 | 69.2 | 69.2 | 75.0 | 60.0 |

Testing

Using each of the compositions, a coated panel was prepared; resistance to fogging by breathing, warm water anti-fog properties, resistance to fogging by dewing, and pensile hardness of the coating panel were measured; and the coated panel was subjected to testing on scratch resistance, resistance to warm water, resistance to moist heat, and heat resistance by testing methods as follows. Test results are indicated in Table 2.

Preparation of Coated Panel

Each composition was applied to a polycarbonate panel 1 mm thick (supplied by Nippon Testpanel Co., Ltd.) by using bar coater, dried at 80° C. for 3 minutes, cured by the irradiation with an ultraviolet ray at a light quantity of 1000 mJ/cm$^2$ using an ultraviolet irradiator EYE INVERTOR GRANDAGE ECS-401GX (supplied by Eye Graphics Co., Ltd.), and yielded a coated panel having a thickness of coating of 10 to 15 μm.

Resistance to Fogging by Breathing

A sample panel was aged at room temperature for one hour, and, after breathing slowly onto the coated surface of the panel for 5 seconds, whether the coated surface fogged or not was visually determined. The resistance to fogging by breathing was evaluated according to criteria as follows:

Good: No change
Fair: Slightly fogged
Poor: Apparently fogged

Resistance to Fogging by Warm Water

A sample panel was placed on the top of a 200-ml beaker containing 100 ml of warm water at 40° C. so that the coated surface of the panel faced the warm water level. The panel was left stand for 60 seconds, and whether the coated surface fogged or not was visually determined. The resistance to fogging by warm water were evaluated according to criteria as follows.

Good: No change
Fair: Slightly fogged
Poor: Apparently fogged

Resistance to Fogging by Dewing

A sample panel was placed on a lump of ice so that the coated surface faced upward, left stand for 60 seconds, and whether the coated surface fogged or not was visually determined. The resistance to fogging by dewing were evaluated according to criteria as follows.

Good: No change
Fair: Slightly fogged
Poor: Apparently fogged

Pencil Hardness

The pencil hardness was rated according to JIS K5400.

Scratch Resistance

The coated surface of each panel was rubbed with a #0000 steel wool through ten reciprocating movements under a load of 100 g/cm$^2$, followed by visually observing how the coating was. The scratch resistance was rated on a scale of one to five.

5: No scratch
4: One to five scratches
3: Six to ten scratches
2: Eleven or more scratches
1: Entirely scratched Resistance to Warm Water A sample coated panel was immersed in warm water at 60° C., left stand for eight hours, subsequently the appearance of the coating was evaluated by visually observing how the coating was, and the resistance to fogging by breathing was evaluated.

Appearance Evaluation
Good: No change
Fair: Whitened or impaired in gloss
Poor: Partial dissolution or separation of coating Resistance to Moist Heat A sample coated panel was placed and left stand in an environmental tester at 85° C. and 90% relative humidity for ten days, subsequently the appearance of the coating was evaluated by visually observing how the coating was, and the resistance to fogging by breathing was evaluated.

Appearance Evaluation
Good: No change
Fair: Whitened or impaired in gloss
Poor: Partial dissolution or separation of coating Heat Resistance A sample coated panel was placed and left stand in an oven at 120° C. for ten days, subsequently the appearance of the coating was evaluated by visually observing how the coating was, and the resistance to fogging by breathing was evaluated.

Appearance Evaluation
Good: No change
Fair: Slightly colored
Poor: Colored or impaired in gloss

TABLE 2

Test Results

| | | Examples | | | | | | | | | | | | | | Comparative Examples | |
|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 1 | 2 |
| Breach anti-fog properties | | Good | Good | Good | Good | Good | Good | Good | Good | Good | Good | Good | Good | Good | Good | Good | Fair |
| Warm water anti-fog properties | | Good | Good | Good | Good | Good | Good | Good | Good | Good | Good | Good | Good | Good | Good | Good | Fair |
| Dewing anti-fog properties | | Good | Good | Good | Good | Good | Good | Good | Good | Good | Good | Good | Good | Good | Good | Good | Fair |
| Pencil hardness | | F | B | F | HB | F | F | F | B | B | B | B | F | B | B | 3B | 2B |
| Scratch resistance | Rating | 5 | 4 | 4 | 5 | 4 | 4 | 5 | 4 | 4 | 4 | 4 | 4 | 4 | 4 | 1 | 2 |
| Resistance to warm water | Appearance | Good | Good | Good | Good | Good | Good | Good | Good | Good | Good | Good | Good | Good | Good | Poor | Fair |
| | Resistance to fogging | Good | Good | Good | Good | Good | Good | Good | Good | Good | Good | Good | Good | Good | Good | Poor | Fair |
| Resistance to moist heat | Appearance | Good | Good | Good | Good | Good | Good | Good | Good | Good | Good | Good | Good | Good | Good | Poor | Fair |
| | Resistance to fogging | Good | Good | Good | Good | Good | Good | Good | Good | Good | Good | Good | Good | Good | Good | Poor | Fair |
| Heat resistance | Appearance | Fair | Fair | Fair | Fair | Fair | Fair | Fair | Good | Good | Good | Good | Good | Good | Fair | Fair | Fair |
| | Resistance to fogging | Good | Good | Good | Good | Good | Good | Good | Good | Good | Good | Good | Good | Good | Good | Poor | Fair |

INDUSTRIAL APPLICABILITY

Water-absorbing resin compositions according to embodiments of the present invention can provide water-absorbing resin compositions and anti-fog coating resin compositions capable of forming cured articles and transparent anti-fog coatings, respectively, which have anti-fog performance lasting significantly longer and excel in properties such as appearance, coatability, anti-fog properties, water resistance, and heat resistance. The resin compositions can further provide laminates. In addition, the resin compositions further excel in antistatic properties and self-cleaning properties (self-purifying properties) and are also usable as ink-jet receiving layers (waterborne ink type).

The invention claimed is:

1. A water-absorbing resin composition comprising at least a (meth)acrylamide copolymer (A); and a bifunctional or higher (meth)acrylate compound (B), the (meth)acrylamide copolymer (A) comprising a (meth)acrylamide monomer (A-1) represented by General Formula 1; and a monomer (A-2) other than the (meth)acrylamide monomer (A-1) and copolymerizable with the (meth)acrylamide monomer (A-1), General Formula 1 expressed as follows:

[Chem. 1]

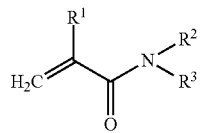

(Formula 1)

wherein $R^1$ represents hydrogen atom or methyl group; and $R^2$ and $R^3$ may be the same as or different from each other and are each hydrogen atom or an alkyl group having 1 to 6 carbon atoms which may have at least one hydroxyl group, or $R^2$ and $R^3$ may form a pyrrolidine ring, piperidine ring, or morpholine ring together with an adjacent nitrogen, wherein a content of the (meth)acrylamide monomer (A-1) is 40 to 85 parts by weight per 100 parts by weight of the entire resin components, wherein the bifunctional or higher (meth)acrylate compound (B) is selected from the group consisting of trimethylolpropane triacrylate, dipropylene glycol di(meth)acrylate, neopentyl glycol di(meth)acrylate, hexanediol di(meth)acrylate, tripropylene glycol di(meth)acrylate, tricyclodecanedimethanol di(meth)acrylate, pentaerythritol tri(meth)acrylate, dipentaerythritol penta(meth)acrylate, dipentaerythritol tetra(meth)acrylate, dipentaerythritol tri(meth)acrylate, trimethylolpropane triacrylate, a mixture including pentaerythritol triacrylate and pentaerythritol tetraacrylate, a mixture including dipentaerythritol pentaacrylate and dipentaerythritol hexaacrylate, polyester (meth)acrylates, and urethane(meth)acrylates, wherein the water-absorbing resin composition contains the bifunctional or higher (meth)acrylate compound (B) in a content of 5 to 60 parts by weight per 100 parts by weight of the total amount of resin components.

2. The water-absorbing resin composition of claim 1, wherein the (meth)acrylamide monomer (A-1) partially or wholly comprises N,N-dimethylacrylamide; and the monomer (A-2) partially or wholly comprises methyl methacrylate.

3. The water-absorbing resin composition of claim 1, wherein the (meth)acrylamide copolymer (A) has a weight-average molecular weight of 500 to 200,000 in terms of polyethylene oxide.

4. An anti-fog coating resin composition comprising the water-absorbing resin composition of claim 1.

5. A cured article cured from the water-absorbing resin composition of claim 1.

6. A laminate comprising a substrate; and a layer present on the substrate, the layer formed by applying the anti-fog coating resin composition of claim 4 to the substrate and curing the applied resin composition.

7. The water-absorbing resin composition of one of claim 2, wherein the (meth)acrylamide copolymer (A) has a weight-average molecular weight of 500 to 200,000 in terms of polyethylene oxide.

8. An anti-fog coating resin composition comprising the water-absorbing resin composition of claim 2.

9. An anti-fog coating resin composition comprising the water-absorbing resin composition of claim 3.

10. A cured article cured from the water-absorbing resin composition of claim 2.

11. A cured article cured from the water-absorbing resin composition of claim 3.

12. A laminate comprising a substrate; and a layer present on the substrate, the layer formed by applying the anti-fog coating resin composition of claim 8 to the substrate and curing the applied resin composition.

13. A laminate comprising a substrate; and a layer present on the substrate, the layer formed by applying the anti-fog coating resin composition of claim 9 to the substrate and curing the applied resin composition.

* * * * *